US012614457B1

(12) United States Patent
Lyle

(10) Patent No.: US 12,614,457 B1
(45) Date of Patent: Apr. 28, 2026

(54) ARTIFICIAL INTELLIGENCE OPTIMIZED PARKING SYSTEM

(71) Applicant: NVIDIA Corporation, Santa Clara, CA (US)

(72) Inventor: Ruthie Lyle, Durham, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 246 days.

(21) Appl. No.: 18/053,047

(22) Filed: Nov. 7, 2022

(51) Int. Cl.
| | |
|---|---|
| *G08G 1/14* | (2006.01) |
| *G06V 10/82* | (2022.01) |
| *G06V 20/20* | (2022.01) |
| *G06V 20/54* | (2022.01) |
| *G06V 40/10* | (2022.01) |
| *G08G 1/017* | (2006.01) |
| *G08G 1/0968* | (2006.01) |

(52) U.S. Cl.
CPC ............. *G08G 1/141* (2013.01); *G06V 10/82* (2022.01); *G06V 20/20* (2022.01); *G06V 20/54* (2022.01); *G06V 40/103* (2022.01); *G08G 1/017* (2013.01); *G08G 1/096811* (2013.01); *G08G 1/146* (2013.01); *G06V 2201/08* (2022.01)

(58) Field of Classification Search
CPC .. G08G 1/141; G08G 1/017; G08G 1/096811; G08G 1/146; G06V 10/82; G06V 20/20; G06V 20/54; G06V 40/103; G06V 2201/08
See application file for complete search history.

(56) References Cited

U.S. PATENT DOCUMENTS

| | | | |
|---|---|---|---|
| 10,066,954 B1 | 9/2018 | Swanson | |
| 10,424,202 B1 | 9/2019 | Beaurepaire | |
| 11,182,598 B2 | 11/2021 | Sriram et al. | |
| 11,631,327 B2 | 4/2023 | Higuchi | |
| 11,748,636 B2 * | 9/2023 | Zhu ..................... | G06Q 10/047 |
| | | | 706/11 |
| 11,861,263 B1 | 1/2024 | Hunt | |

(Continued)

FOREIGN PATENT DOCUMENTS

WO        WO-2022158449 A1 *   7/2022   ............... E04H 6/12

OTHER PUBLICATIONS

Stack Exchange, "What is the difference between convolutional neural networks and deep learning?" 2019 (Year: 2019).*

(Continued)

*Primary Examiner* — Stephanie T Su
(74) *Attorney, Agent, or Firm* — Plumsea Law Group, LLC

(57) ABSTRACT
A methods and systems for using artificial intelligence to recommend optimal parking spaces for vehicles. Using artificial intelligence includes using computer vision systems to analyze images of a vehicle and/or of the vehicle's occupants. This can include using an image description model to automatically generate natural language descriptions of the images. These natural language descriptions can be further processed using a large language model. Information from these natural language descriptions is used as inputs to a parking recommendation system. Based on information about the vehicle, occupants, and available parking spaces, the system can automatically recommend a parking space that is optimal for the vehicle and passengers. The system can also provide navigation information for the space to the driver and/or onboard vehicle systems.

20 Claims, 7 Drawing Sheets

502

PARKING RECOMMENDATION PARAMETERS

| VEHICLE PARAMETERS | OCCUPANT PARAMETERS | PARKING SPACE PARAMETERS |
|---|---|---|
| VEHICLE TYPE | OCCUPANT NUMBER | SPACE COORDINATES |
| VEHICLE DIMENSIONS | OCCUPANT AGE(S) | NOMINAL SPACE DIMENSIONS |
| VEHICLE TRUNK CLEARANCE | OCCUPANT SIZE(S) | REAL-TIME SPACE DIMENSIONS |
| VEHICLE DOOR CLEARANCE(S) | CLASSIFICATION TAGS | ADJACENCY INFO |
| TURNING RADIUS | | SPACE CONDITIONS |
| PARKING ASSISTANCE SYSTEMS | | CLASSIFICATION TAGS |
| VEHICLE PERMIT(S) | | |
| CLASSIFICATION TAGS | | |

602                                  604                                  606

(56)        References Cited

U.S. PATENT DOCUMENTS

| | | | |
|---|---|---|---|
| 12,112,131 B2 | 10/2024 | Newman | |
| 12,148,421 B2 | 11/2024 | Baeuml | |
| 2018/0130125 A1 | 5/2018 | Gazlay | |
| 2020/0018602 A1* | 1/2020 | Beaurepaire | G08G 1/146 |
| 2020/0019761 A1* | 1/2020 | Kang | G06V 10/764 |
| 2020/0035101 A1* | 1/2020 | Brooks | G08G 1/143 |
| 2020/0363801 A1* | 11/2020 | He | G06F 16/9537 |
| 2021/0382925 A1 | 12/2021 | Fincun | |
| 2021/0390609 A1 | 12/2021 | Trinh | |
| 2022/0044198 A1 | 2/2022 | Meister | |
| 2023/0083512 A1 | 3/2023 | Newman et al. | |
| 2023/0101037 A1 | 3/2023 | Haertel et al. | |
| 2023/0162481 A1* | 5/2023 | Yuan | G06T 9/00 |
| | | | 382/159 |
| 2023/0222912 A1* | 7/2023 | Barrett | G06Q 10/02 |
| | | | 340/932.2 |
| 2023/0365193 A1 | 11/2023 | Ashida et al. | |
| 2023/0376838 A1 | 11/2023 | El Hattami | |
| 2024/0111960 A1 | 4/2024 | Earle | |
| 2024/0135835 A1* | 4/2024 | Lee | G06V 10/945 |

OTHER PUBLICATIONS

Non-Final Office Action mailed Jan. 16, 2025 for U.S. Appl. No. 18/053,039.

Final Office Action mailed May 19, 2025, for U.S. Appl. No. 18/053,039, 25 pp.

* cited by examiner

THE VEHICLE IS A *TOYOTA COROLLA*. THE *DRIVER IS MALE*, IN THE *AGE RANGE OF 30-39*. THERE IS *ONE FRONT PASSENGER* WHOSE GENDER AND AGE ARE UNKNOWN. THE VEHICLE HAS A *HANDICAP PERMIT*.

408

204

LARGE LANGUAGE MODEL

402

A MAN IN HIS 30S DRIVING A CAR.

404

A TOYOTA COROLLA WITH ONE FRONT PASSENGER.

406

A TOYOTA COROLLA WITH ONE FRONT DRIVER AND ONE FRONT PASSENGER.

A HANDICAP PERMIT.

312

314

316

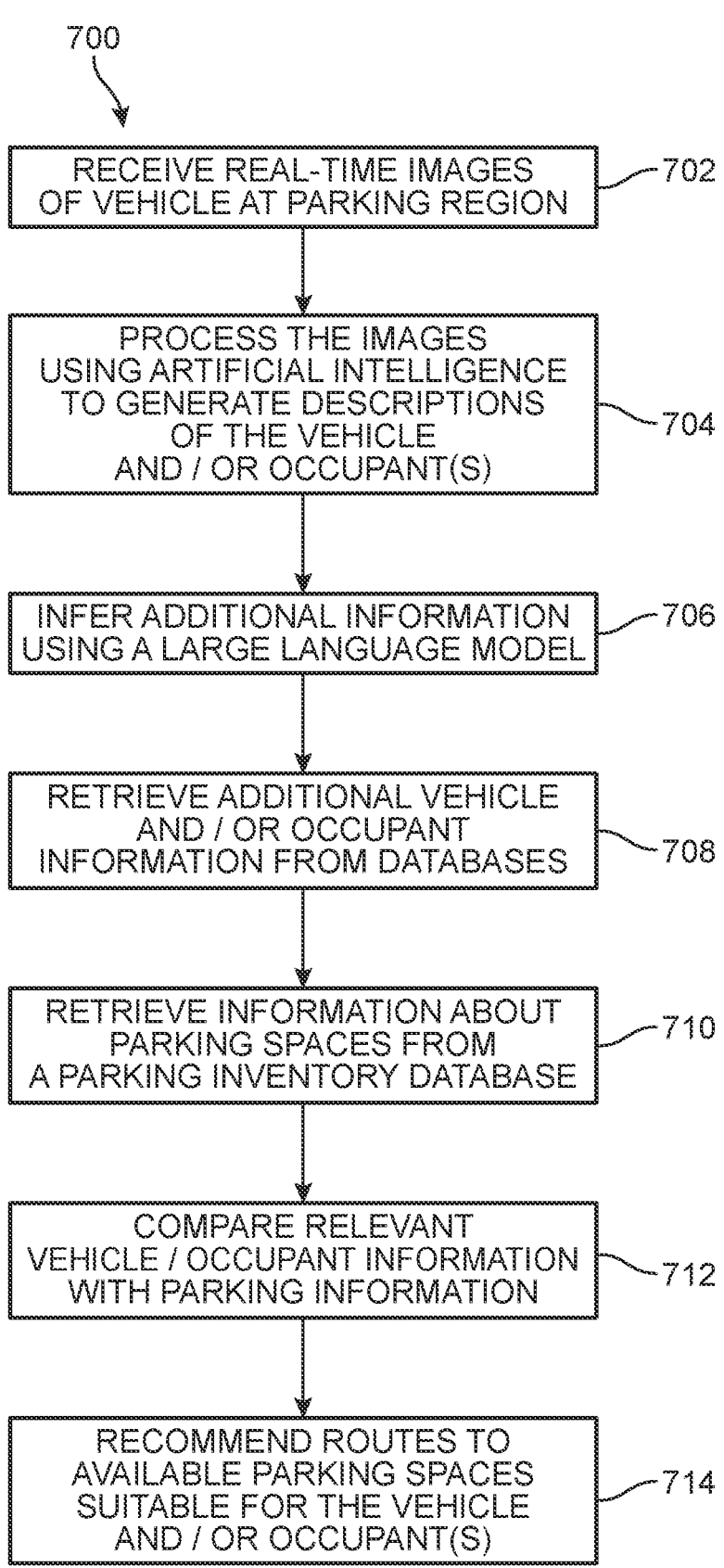

700

RECEIVE REAL-TIME IMAGES
OF VEHICLE AT PARKING REGION — 702

PROCESS THE IMAGES
USING ARTIFICIAL INTELLIGENCE
TO GENERATE DESCRIPTIONS
OF THE VEHICLE
AND / OR OCCUPANT(S) — 704

INFER ADDITIONAL INFORMATION
USING A LARGE LANGUAGE MODEL — 706

RETRIEVE ADDITIONAL VEHICLE
AND / OR OCCUPANT
INFORMATION FROM DATABASES — 708

RETRIEVE INFORMATION ABOUT
PARKING SPACES FROM
A PARKING INVENTORY DATABASE — 710

COMPARE RELEVANT
VEHICLE / OCCUPANT INFORMATION
WITH PARKING INFORMATION — 712

RECOMMEND ROUTES TO
AVAILABLE PARKING SPACES
SUITABLE FOR THE VEHICLE
AND / OR OCCUPANT(S) — 714

FIG. 7

ARTIFICIAL INTELLIGENCE OPTIMIZED PARKING SYSTEM

TECHNICAL FIELD

The present disclosure generally relates to parking systems, and to parking systems that utilize artificial intelligence.

BACKGROUND

Parking facilities, such as parking garages and warehouses, may track the occupancy of parking spaces to provide an updated count of available spaces. The facilities may also track which spaces are occupied or unoccupied. Signs indicating to drivers that there are available spaces, or even indicating regions where spaces are open, may rely on assumptions about the vehicle, the vehicle's contents, the vehicle's occupants, as well as the condition of the spaces in the facility.

There is a need in the art for a system and method that addresses the shortcomings discussed above.

SUMMARY

In one aspect, the techniques described herein relate to methods and systems for using artificial intelligence to recommend optimal parking spaces for vehicles. Using artificial intelligence includes using computer vision systems to analyze images of a vehicle, a vehicle's contents, and/or of the vehicle's occupants. This can include using an image description model to automatically generate natural language descriptions of the images. These natural language descriptions can be further processed using a large language model. This also include using object detection models to infer the presence of occupants, placement or goods and make and state of vehicles. Similarly gender and age identification models can classify occupants. Information from diverse machine learning models together with natural language descriptions are used as inputs to a parking recommendation system. Based on information about the vehicle, occupants, and available parking spaces, the system can automatically recommend a parking space that is optimal for the vehicle and passengers. The system can also provide navigation information for the space to the driver and/or onboard vehicle systems.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 7 is a schematic view of a process for providing a parking recommendation for a vehicle, according to an embodiment.

DESCRIPTION OF THE EMBODIMENTS

Figure 1:
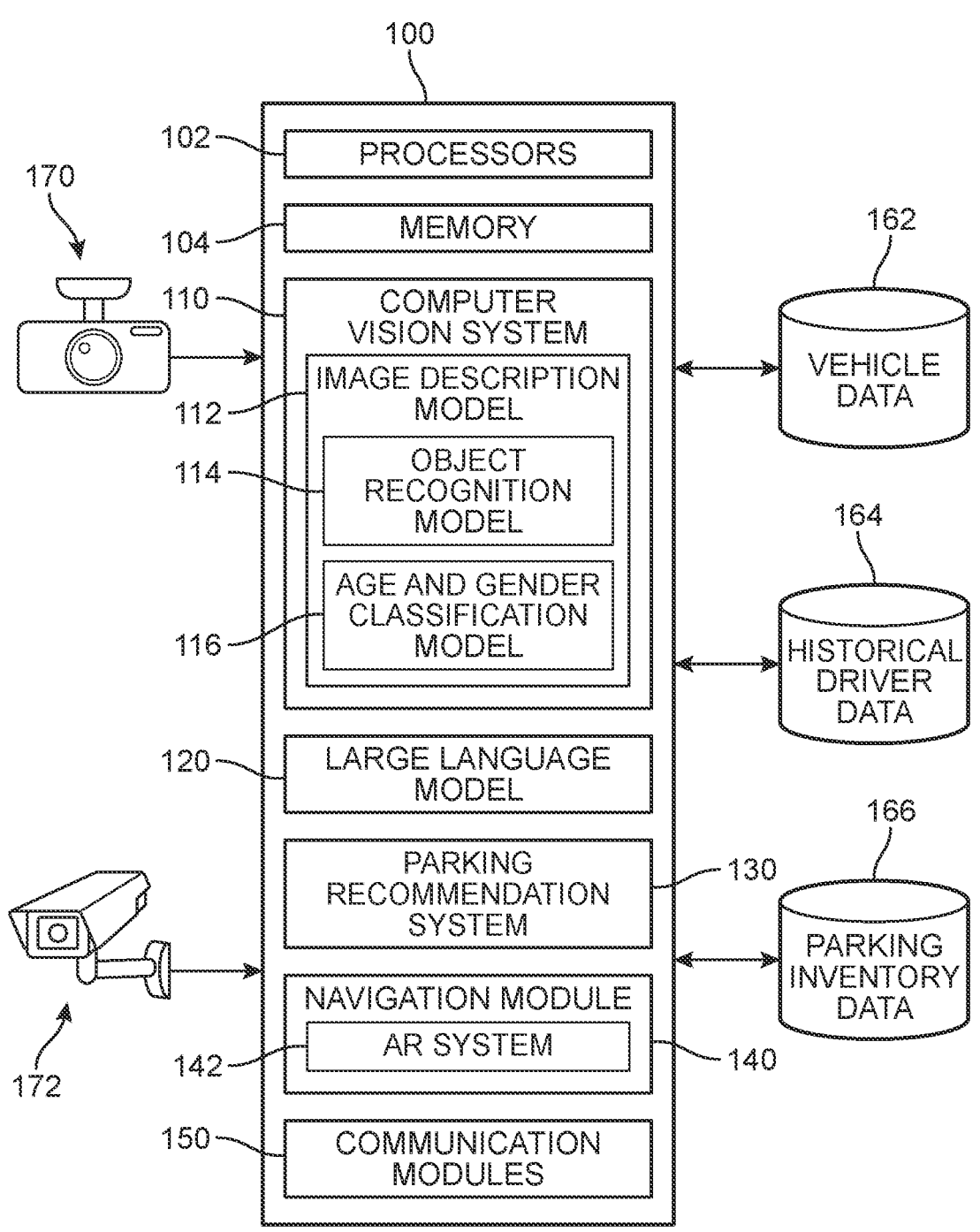
FIG. 1 is a schematic view of a system for automatically generating parking recommendations for vehicles, according to an embodiment.

FIG. 1 is a schematic view of an artificial intelligence (AI) optimized parking system 100. AI optimized parking system 100 (or simply, "system 100") can provide automated parking recommendations for vehicles at a parking facility or parking region. System 100 may comprise processors 102 and memory 104. Memory 104 may comprise a non-transitory computer-readable media for storing instructions that may be executed by processors 102.

It may be appreciated that in some embodiments, the systems and methods described herein may be used to find parking regions for a broad class of vehicles, including both manned vehicles and autonomous vehicles. Vehicles could include, but are not limited to, cars, buses, trains, trucks, robots, e-bikes, aerial vehicles (such as drones), or other suitable vehicles.

System 100 can include a computer vision system 110. Computer vision system 110 comprises one or more models that can be used to perform tasks related to images including generating image descriptions, detecting people and/or objects, and classifying people and/or objects. In some cases, computer vision system 110 includes an image description model 112.

Image description model 112 can comprise any suitable models for recognizing the context of an image and automatically generating descriptions about persons, places, or things within the image. Any suitable image description model (also known as an image captioning model) could be used, including any commercially available systems.

In some embodiments, image description model 112 includes at least one object recognition model 114. Object recognition module 114 may include any suitable models for detecting objects and/or persons within an image. In some cases, an object detection model could also be used. Whereas an object recognition model may recognize all relevant objects within an image, an object detection model may be provided with a predetermined class of objects and look only for instances of objects in that class. Object recognition model 114 may be configured for detecting persons, vehicles, as well as other objects. Examples of other objects that may be relevant for parking recommendations include occupant indicators. Occupant indicators are objects/items that indicate information about occupants of the vehicle. Examples of occupant indicators that could be recognized by the system include a handicap decal (or handicap permit), a student driver decal, a parking permit, or a baby on board decal. Each of these different occupant indicators could, when recognized by the system, provide additional information for making parking recommendations.

In some embodiments, image description model 112 may also include an age and gender classification model 116. Age and gender classification model 116 may comprise any suitable models for identifying the age and/or gender of a person in an image. In some embodiments, models may comprise convolutional neural networks (CNNs) that are trained to classify persons within an image according to age and/or gender.

System 100 can also include large language model 120 ("LLM 120"). Large language models may comprise very large transformer neural networks comprising hundreds of billions of parameters. Different embodiments could utilize different types of LLMs. Some LLMs may include a very large number of parameters, in some cases LLMs may use hundreds of billions or trillions of parameters. To accommodate this scale of computing, these LLMs may be executed on custom, proprietary machine learning processors or chips. However, in other embodiments, LLMs may be executed using commercially available hardware. A non-limiting example of an LLM running on proprietary hardware is the Bidirectional Encoder Representations from Transformers (BERT)-Large language model that runs on 1,472 NVIDIA V100 GPUs. Another non-limiting example of an LLM running on proprietary hardware is Google Research's Pathways Language Model (PaLM) that runs on a cluster of 6144 proprietary TPU chips. Other examples of LLMs include Gopher by DeepMind and OpenAI's GPT-3 (Generative Pre-Trained Transformer-3). The preparation and the amount of training provided to the LLMs prior to use may vary. In some cases, very little training may be provided to the LLM. In some embodiments, the LLM is trained with zero-shot or few-shot. In other embodiments, the initial training includes fine tuning techniques.

Using LLMs over other NLP models may provide quicker training and development of a system, since LLMs may be offered as services that do not require a lot of coding. Rather than retrain an entire LLM using standard supervised learning techniques, LLMs can be trained using so called "prompt tuning" (or "p-tuning") methods. With prompt tuning, developers can provide sample questions and responses to the LLM. When similar questions are asked later, a prompt token is supplied along with the questions, to give the LLM the specific context for more accurate responses.

System 100 may also include a parking recommendation system 130. A parking recommendation system (comprised of one or more algorithms) may comprise a system that takes inputs and provides a recommended parking region. As used herein, a parking region comprises any region where a vehicle may stop and wait for some period. A parking region could comprise a parking space (or parking spot) or any other suitable region of space that the vehicle can occupy. A vehicle may occupy a parking region for various reasons. For example, an occupant may park a vehicle in a parking space while they go into a store. In another example, a vehicle may occupy a parking region while the vehicle is being electrically recharged. In another example, a vehicle may occupy a parking region while it receives maintenance. In another example, a vehicle may occupy a parking region while goods are loaded onto to it and/or unloaded from it. Moreover, it may be appreciated that while in some cases parking regions could be pre-designated, for example using painted lines in a parking facility, in other cases parking regions could be dynamic. For example, in a warehouse setting with robotic vehicles moving around goods, parking regions could be defined in real time as any available space where the vehicles can load or unload goods. In these situations, parameters of the parking regions could be determined dynamically, using, for example, object recognition to identify a suitable empty space along with its dimensions.

A parking recommendation system could comprise a machine learning algorithm, an expert system, or a large language model trained with prompt-based (or "p-tuning") training methods.

System 100 could include a navigation module 140. Navigation module 140 may utilize 3D models and/or geographic information systems (GIS) to generate directions, routes, or general instructions for users as they navigate through a parking facility to a particular parking space. Some embodiments could further include an augmented reality system 142 ("AR system 142"), which could be used to display routes or other navigation directions over a live video feed and/or on a heads-up display within a vehicle.

System 100 can also include one or more communication modules 140. Communication modules 140 could comprise various hardware and/or software modules for communicating with other components and systems. For example, communication modules 150 could include hardware and software for receiving images from one or more cameras. Communication modules 140 could also include hardware and/or software modules for transferring data between system 100 and external systems, including databases.

System 100 can receive image data from one or more sources. In FIG. 1, for example, system 100 may receive images (including still images or video images) from one or more cameras. In some cases, system 100 receives images from a dashboard camera 170, which could be located within a vehicle, to provide images from within a vehicle. In some cases, system 100 receives images from a parking facility camera 172, which may be positioned within the parking facility to capture external images of a vehicle. Although only two cameras are shown in FIG. 1, other embodiments could receive images from any number of cameras, including cameras located within a vehicle and cameras located externally to a vehicle.

System 100 may request and receive various kinds of data from external systems, including external databases. In some cases, system 100 could retrieve vehicle data 162 from a corresponding database. Vehicle data 162 can include any data associated with a particular type, including make and/or model, of vehicle. Vehicle data 162 could include vehicle dimensions, vehicle weight, vehicle trunk (or other storage compartment) clearances, door clearances, a vehicle turning radius, as well as information about relevant parking assistance systems that may be used by the system.

In some cases, system 100 could retrieve historical driver data 164 from a corresponding database. Historical driver data 164 may include various kinds of historical data related to incidents with drivers/vehicles in the current parking facility, or in other parking facilities. This data could include, for example, data on drivers for accessing and successfully parking in various types of spaces, such as standard spaces, diagonal spaces, extra narrow spaces, spaces bounded by walls and/or columns (for example, in an underground parking garage), spaces at corners, or other information. In some cases, the data could be segmented according to age or other characteristics of drivers and/or vehicles. As described in further detail below, historical driver data 164 could be considered by the system when making a parking recommendation.

In some cases, system 100 could retrieve parking inventory data 166. Parking inventory data 166 could include real-time data associated with parking spaces in a parking facility. This data could be tracked and updated by another system associated with the parking facility. In some cases, the data could be tracked and updated by components of system 100. For example, using video feeds of spaces received from one or more cameras (such as camera 172) in a parking facility, system 100 could automatically identify occupied and unoccupied spaces. In particular, in some cases, system 100 could leverage computer vision system 110 to distinguish between occupied and unoccupied spaces within images.

Parking inventory data 166 can include a space ID and a space status (such as "occupied" or "unoccupied"). Additionally, parking inventory data 166 can include specifications for the space (such as the dimensions and the orientation of the space), the coordinates or location of the space relative to other spaces and/or within the region/facility, or other suitable information. As described in further detail below, in some cases, information such as the dimensions of the space could be updated in real time by analyzing real-time images of the space and adjacently parked vehicles that may be encroaching into the space.

Figure 2:
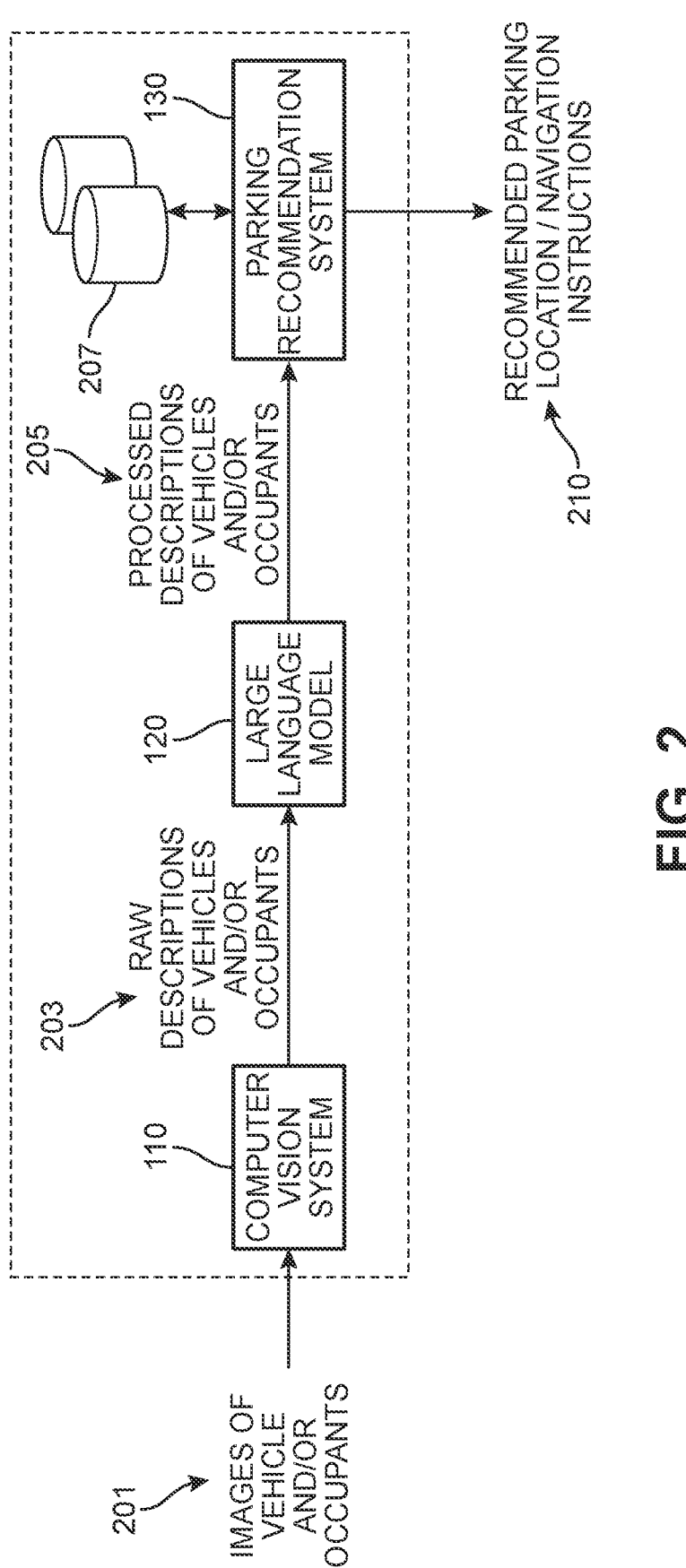
FIG. 2 is a schematic view showing the flow of information in the case of an artificial intelligence optimized parking system, according to an embodiment.

FIG. 2 is a schematic view showing the flow of information in the case of an AI optimized parking system, according to an embodiment. Images of a vehicle and/or occupants (input 201) are fed into computer vision system 110. Using one or more computer vision models, the images are processed and raw descriptions of the vehicles and/or occupants (output 203) are generated. For example, in one embodiment, images are all processed with image description model 112, and the resulting descriptions (or captions), are provided as input to LLM 120.

LLM 120 processes the raw descriptions of vehicles and/or occupants and generates processed descriptions of vehicles and/or occupants (output 205). The processed outputs are then fed to parking recommendation system 130. Parking recommendation system 130 can retrieve additional data from databases 207 (including any of vehicle data 162, historical driver data 164, and parking inventory data 166 from FIG. 1). The final output of parking recommendation system 130 is a set of output 210, which may comprise a recommended parking location and/or navigation instructions to the recommended parking location. In some cases, the output could comprise a list of two or more recommended parking locations.

It may be appreciated that in other embodiments, raw descriptions of images generated by computer vision system 110 could be used as direct inputs to parking recommendation system 130, without any intermediate processing by a large language model. Such an architecture may be useful in situations where the computational costs of running a large language model outweigh the benefits of improved accuracy of the system.

Figure 3:
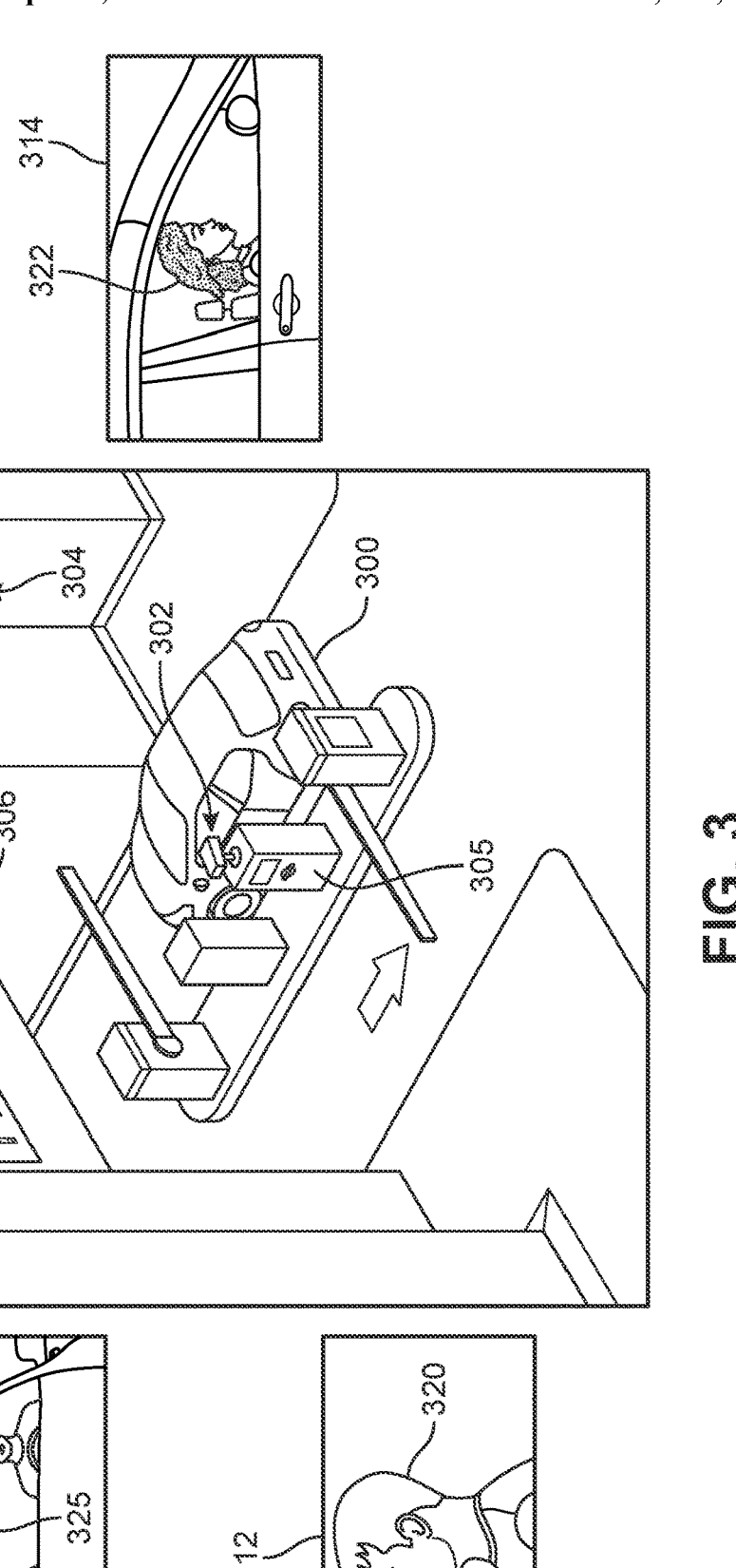
FIG. 3 illustrates a scenario in which a driver receives a parking space recommendation from an artificial intelligence optimized parking system, according to an embodiment.

FIG. 3 illustrates a scenario in which a driver receives a parking space recommendation from an AI optimized parking system, according to an embodiment. Referring to FIG. 3, vehicle 300 arrives at a parking garage. As vehicle 300 pulls up to the entrance of the garage, multiple images of the vehicle and/or occupants are captured using multiple cameras associated with the facility.

A first camera 302, a disposed on a ticketing station 305, captures a driver side view of vehicle 300 (first image 312), in which driver 320 is also visible. A second camera 304 captures a passenger side view of vehicle 300 (second image 314), in which passenger 322 is also visible. A third camera 306 captures a front view of the vehicle (third image 316), in which a driver 320 and a passenger 322 are both visible. Also visible within image 316 is a handicap permit 325.

Figure 4:
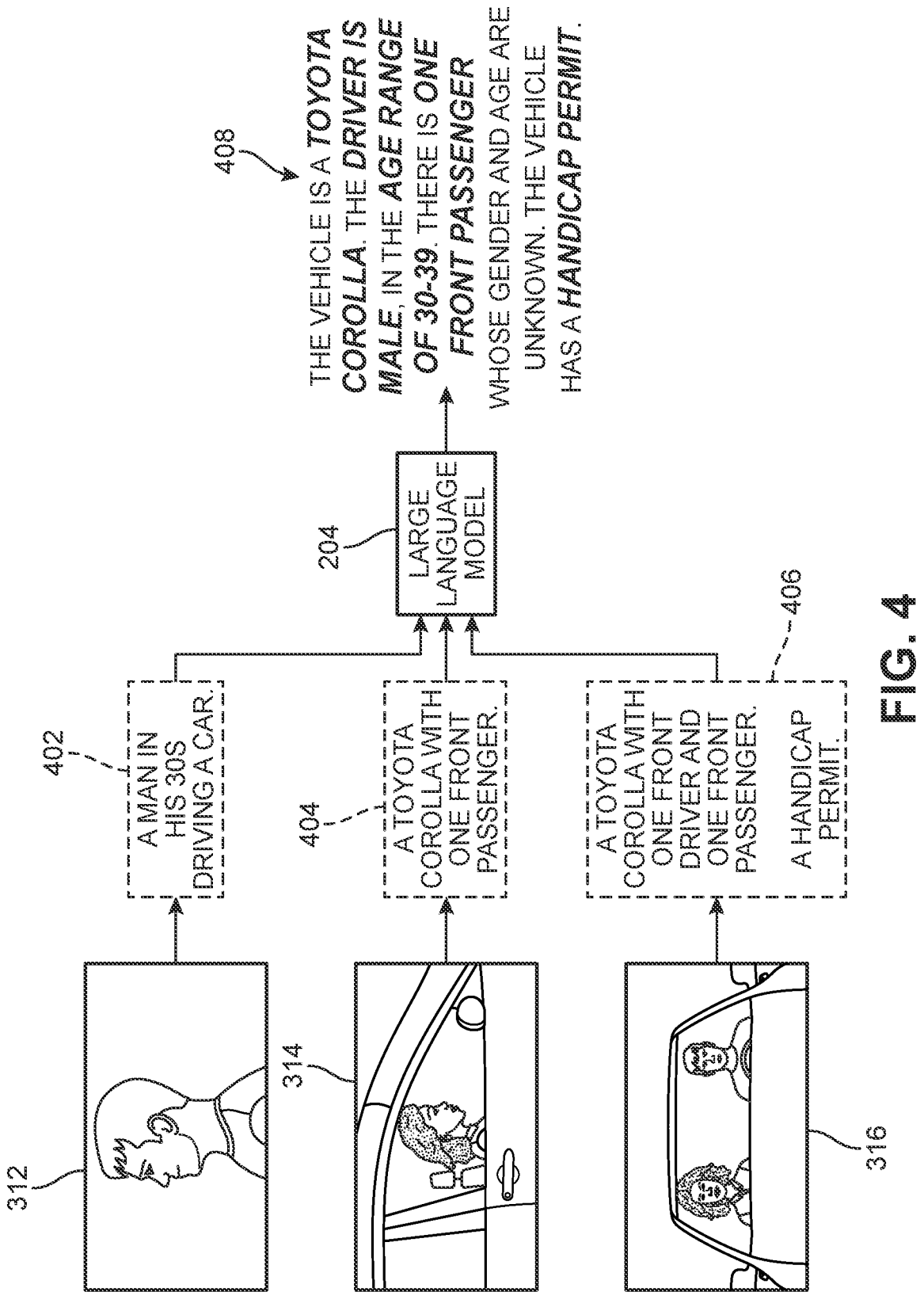
FIG. 4 is a schematic view of the processing of input data, according to an embodiment.

FIG. 4 is a schematic view of the processing of input data, according to an embodiment. Referring to FIG. 4, computer vision system 110 is used to process input images (including first image 312, second image 314, and third image 316). Computer vision system 110 outputs natural language descriptions for each image, including a first description 402 for first image 312, a second description 404 for second image 314, and a third description 406 for third image 316.

In generating these descriptions, computer vision system 110 could make use of image description model 112. For example, computer vision system 110 could be used to identify people, vehicles, and/or other objects within images, for example, by leveraging object recognition model 114. As an example, in the example in FIG. 4, computer vision system 110 can identify a driver, a passenger, a vehicle (a Toyota Corolla), and a handicap permit. Moreover, using age and gender classification model 116, computer vision system 110 is further able to identify the driver as a man in his thirties.

In the exemplary embodiment, the three descriptions are then passed to LLM 120 for further processing. Here, LLM 120 receives each of the descriptions and generates a summary 408 which comprises data in a suitable format for use as input to a parking recommendation system. Using LLM 120, the system can reason about information from the different descriptions to arrive at a unified summary. Moreover, whereas obtaining parameter-specific information from the individual image descriptions may rely on keyword extraction, LLM 120 could be receive requests for information from parking recommendation system 130 and provide more robust responses that are less reliant on explicit matches between the terminology used by image description model 112 and parking recommendation system 130.

In other embodiments, the descriptions for each image could be independently provided as inputs to a parking recommendation system, rather than first processed using a large language model.

Figure 5:
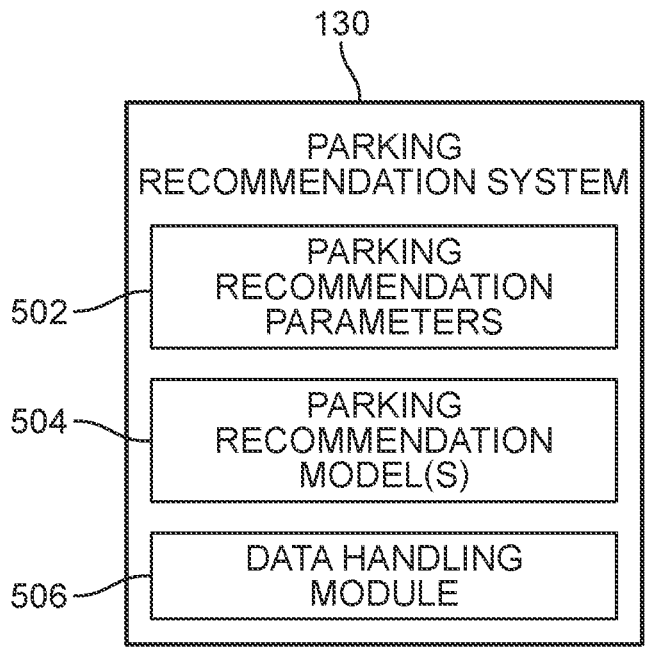
FIG. 5 is a schematic view of a parking recommendation system, according to an embodiment.

FIG. 5 is a schematic view of parking recommendation system 130, according to an embodiment. Parking recommendation system 130 considers information about a vehicle, the vehicle's occupants, and the available spaces to find an optimal parking space for the vehicle. For example, parking recommendation system 130 could receive information about a large SUV and determine an optimal parking space that is extra wide compared to most spaces in the facility. In some embodiments, parking recommendation system 130 may include parking recommendation parameters 502, parking recommendation models 504, and a data handling module 506.

Figure 6:
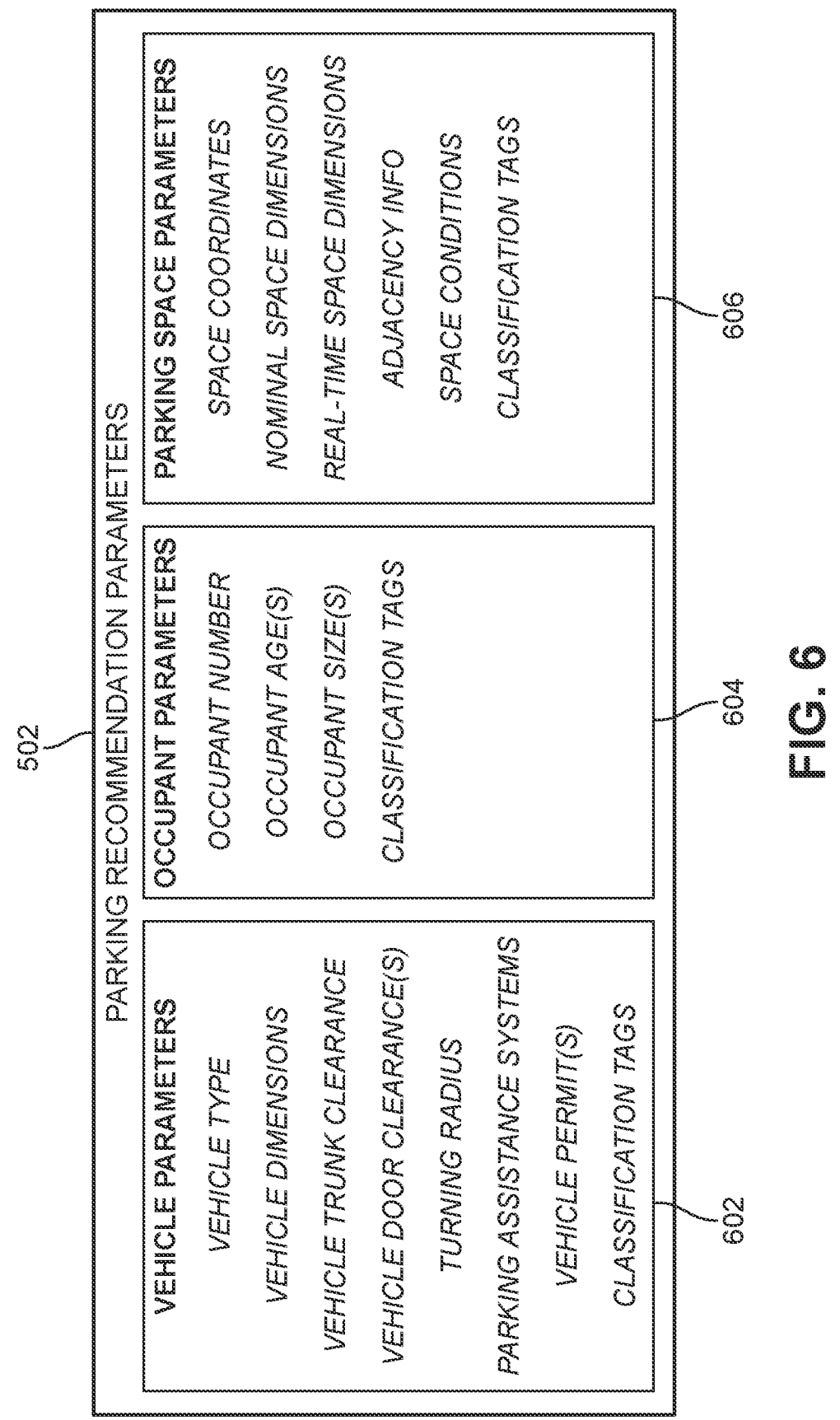
FIG. 6 is a schematic view of a set of exemplary parameters for a parking recommendation system, according to an embodiment.

Parking recommendation parameters 502 comprise various parameters, or inputs, to parking recommendation models 504. A set of exemplary parameters 502 are shown in FIG. 6. These include parameters of the model that are related to features of a vehicle (vehicle parameters 602), parameters of the model that are related to occupants (or passengers) of the vehicle (occupant parameters 604), and parameters of the model that are related to the parking spaces within the facility (parking space parameters 606).

Exemplary vehicle parameters include a vehicle type. The vehicle type could include a general class of vehicle, such as a coupe, a sedan, a sports utility vehicle (SUV), a truck, a motorcycle, or other such vehicle classes. Knowing information about the vehicle type can be useful for determining an optimal parking space, as different classes of vehicles may generally have different approximate shapes and dimensions. In some cases, the vehicle type could include a particular make and/or model of vehicle.

Exemplary vehicle parameters include vehicle dimensions, including a vehicle length, a vehicle width, and a vehicle height, which may also be useful in determining an optimal parking space.

Exemplary vehicle parameters can include vehicle trunk (or storage compartment) clearance and vehicle door clearance(s). Knowing these clearances, a system can better match a vehicle with a space that is sufficiently large enough for the doors and trunk to be opened without extending outside of the boundaries of the space (and therefore, possibly contacting a neighboring vehicle).

Exemplary vehicle parameters can include a turning radius. Information about the vehicle's turning radius can help a system identify spaces that are easily accessible to a vehicle. For example, if a space is available but requires a vehicle to make very tight turns to access the space, the system may consider the turning radius in determining whether to recommend that space.

Exemplary vehicle parameters can include parking assistance systems. For example, knowing that a vehicle has a particular kind of parking assistance system could be helpful when determining whether a particular parking space is easily or not easily accessible for the vehicle and/or driver.

Exemplary vehicle parameters can include vehicle permits. For example, knowing that a vehicle has a handicap permit or a special parking permit allows the system to consider spaces that would not be available to users without those permits.

Exemplary occupant parameters include an occupant number. Knowing the number of occupants in a vehicle may be useful when determining an optimal parking space. For example, it may generally be desirable to avoid very tight spaces when there are many occupants, as more occupants increases the chances that one of the vehicle doors could contact a neighboring vehicle when the space is very tight. Likewise, knowing that there is only one occupant (a driver) can be helpful as some spaces may be configured such that it's easy for the driver to exit the vehicle, but not occupants on the passenger side.

Exemplary occupant parameters can include occupant ages. Knowing the ages of one or more occupants may be useful for determining an optimal parking space. For example, it may be generally desirable to avoid spaces that requires stairs for access, or which are especially tight, when the occupants are elderly. It may also be generally desirable to avoid tight spaces when the occupants are young children, who are often not careful when opening and closing doors.

Exemplary occupant parameters can include occupant sizes. In some cases, sizes could include broad classes, such as "child" or "adult". In some cases, sizes could be associated with approximate dimensions, including a height and/or width. Such information could be useful in determining whether to recommend a tight space, for example.

Exemplary parking space parameters include any information about parking spaces within the facility. These can include space coordinates (or locations). The coordinates or locations could be absolute (for example, a GPS position within a parking facility) or relative (for example, information about where a space is located relative to other nearby spaces).

Exemplary parking space parameters could include nominal space dimensions, which can include the length and width of the space. Nominal space dimensions refer to dimensions of the space as intended. By contrast, exemplary parking space parameters could also include real-time space dimensions. These may be different from the nominal space dimensions when, for example, a vehicle is incorrectly parked over one of the lines bounding a parking space. Real-time space dimensions could be determined using cameras within a parking facility along with computer vision algorithms to infer real-time deviations from the nominal space size.

Exemplary parking parameters can also include adjacency information. This could include, for example, information about spaces and/or parked vehicles, adjacent to a space. For example, if a very expensive car is parked in a space within a parking facility, the system could automatically identify the two adjacent spaces as un-usable, to ensure that the expensive car is not damaged by another vehicle's door, for example.

Exemplary parking parameters can also include conditions of the parking space. For example, if a camera in a parking garage detects a large puddle of water in a space (for example, by analyzing images of the space with a computer vision system), this information could be stored in the space conditions parameter. Then, when making parking recommendation, the system could avoid recommending the space with the large puddle.

Each of the various parking recommendation parameters could also include classification tags. By contrast with some of the above parameters, which may be numeric in format (for example, vehicle dimensions could be given in meters), classification tags refer broadly to any classes or general features that the system would want to associate with the considered vehicle, its occupants, and any spaces considered for recommendation. The tags could comprise a shared nomenclature for identifying properties across vehicles, occupants, and spaces, such as concepts of size. For example, vehicles could be classified as small, medium, or large, and spaces could likewise be classified as small, medium, or large. The tags could then be used by any parking recommendation models to either find optimal spaces for a given vehicle (and its occupants), or else help filter out spaces so that the parking recommendation model may consider a smaller set of possible spaces.

In other embodiments, additional parking recommendation parameters could include vehicle contents. In some embodiments, the contents could be goods moved by robotic vehicles in a warehouse. As an illustrating example, the systems and methods described herein could be used to recommend suitable locations for autonomous robots to unload goods in the context of a warehouse. In one embodiment, autonomous pallet movers may travel through a warehouse to move goods between different areas of the warehouse including onto/off of shelves and trucks. Using the principles discussed above, a system could capture images of the pallet mover with loaded goods, and analyze the images using a suite of machine learning models, for example using components of computer vision system 112 (see FIG. 1). In particular, the system could identify not only information about the vehicle (a pallet mover) but also the contents of the vehicle (the goods loaded onto the vehicle). Information about the contents of the vehicle (such as the dimensions, general category, or other properties of the contents) can then be provided as another input to the parking recommendation algorithm as the system attempts to find a suitable parking region where the pallet mover can unload the identified goods. Moreover, in other embodiments, any suitable contents could be analyzed by the system to determine additional information that may be considered by the recommendation system.

Referring to FIG. 5, parking parameters may be inputs to one or more parking recommendation models 504. Parking recommendation models 504 could comprise any suitable machine learning models, expert systems, or other algorithms for determining an optimal parking space from the set of provided parameters.

In some embodiments, parking recommendation models 504 could comprise trained machine learning models. For example, in one embodiment, parking recommendation models 504 could comprise decision trees that are trained to predict optimal parking spaces for a given set of input parameters. In another embodiment, a suitable neural network could be trained to recommend parking spaces (output nodes of the network) based on the parameter values (input nodes of the network).

In some cases, parking recommendation models 504 could consider historical driver data in determining optimal parking spaces. For example, based on information gathered by the system about an occupant's age, the system could look-up historical driver data (such as historical driver data 164) for persons of a similar age to determine if some spaces may be difficult for those drivers to access. As an example, a parking facility could have a parking space that is very difficult to access and the historical driver data could indicate that persons older than a threshold age typically have difficulty parking in that space. In that case, parking recommendation models 504 would not recommend that particular parking space to anyone older than the threshold age.

In some embodiments, a parking recommendation model could be configured to provide multiple outputs. As an example, in embodiments where two or more vehicles are analyzed simultaneously, the system could be configured to output a recommended parking region for each of the vehicles.

Parking recommendation models 504 pass outputs to data handling module 506. Data handling module 506 may generate suitable information that conveys recommended parking location information to end users and/or other autonomous systems. In some cases, data handling module 506 could pass information about a recommended parking space to a vehicle's onboard navigation system (such as navigation module 140), so that the system can display a navigation route through the garage. In some cases, an onboard AR system could be used to project a virtual route over a video display of the parking facility or on a heads-up display of the vehicle.

FIG. 7 is a schematic view of a process 700 for providing a parking recommendation for a vehicle. It may be appreciated that in some embodiments one or more of the following operations could be performed by system 100, including one or more subsystems, modules, models, or other components. Moreover, the operations are not necessarily limited to a particular sequence or order. In some embodiments, one or more operations could be optional.

In operation 702, system 100 receives real-time images of a vehicle at a parking region. The term parking region may refer to a parking deck, a parking lot, a parking garage, a warehouse, or a train yard. The term parking region could also be used to refer to individual parking spaces (or spots) within any of these different parking facilities. As discussed above, the images could be captured by one or more cameras operating at a parking facility (such as a parking garage). In some cases, some of the images could be captured by cameras inside the vehicle, such as a vehicle dashboard camera. Using different cameras may allow the system to capture images of an interior of the vehicle, an exterior of the vehicle, or at least a portion of the environment around the vehicle.

In operation 704, system 100 processes the images using artificial intelligence to generate descriptions of the vehicle and/or occupant(s). As an example, the images could be processed using an image description model, such as image description model 112.

In operation 706, system 100 may infer additional information from the generated descriptions, using a large language model. This operation may help in transforming the raw image descriptions generated from a computer vision system, into a format where various parking recommendation parameters are more explicitly stated. This helps in identifying exactly which information should be passed as parameters values to the parking recommendation system.

In operation 708, system 100 may retrieve additional vehicle and/or occupant information from any associated databases. For example, based on object recognition performed using computer vision system 110, system 100 could identify a make and/or model of a vehicle. System 100 could then look-up information for the make and model of vehicle in a relevant database (for example, system 100 could retrieve the relevant information from vehicle data 162). The retrieved dataset could include information such as the vehicle dimensions, door/trunk clearances, turning radius, parking assistance systems, or other suitable information.

In operation 710, system 100 may retrieve information about parking spaces from a parking inventory database. This can include not only a list of available spaces, but also information about the available spaces that may be useful in finding an optimal space for the vehicle. In some embodiments, a parking facility with a sufficient number of cameras could capture an image for each spot, or for each open/available spot. These images could be stored (for example, as part of parking inventory data 166 in FIG. 1) and then retrieved by system 100 later. In some cases, system 100 could apply computer vision models to images of the parking spaces to determine information such as the parking space size, the state of the parking space (for example, whether it clean and dry or whether it has a puddle and is filled with trash), and changes in the nominal space size due to the encroachment of other vehicles.

In operation 712, system 100 may compare relevant vehicle/occupant information with the retrieved parking information. As an example, this could include making direct comparisons between, for example, vehicle sizes and space sizes, to determine which spaces might best fit a given vehicle. In some cases, this comparison is done implicitly using, for example, a machine learning model that receives both vehicle/occupant and parking space parameters as inputs.

In operation 714, system 100 may recommend an optimal space that is suitable for the vehicle and/or occupants. In some cases, the system could generate navigation information to the recommended space, which can be displayed for the driver. In some cases, the displayed route could be shown via a virtual route using an AR system within the vehicle.

In some embodiments, to help a driver in navigating to a selected parking space, system 100 could capture any available images of the selected space and send those images, along with the navigation information, to an onboard vehicle system, mobile device, or other suitable system used by the driver for navigation.

The embodiments need not be limited to parking cars, trucks, or similar vehicles. The systems and methods discussed here could also be applied to automatically recommending parking locations (facilities or spaces) to any suitable vehicles including autonomous vehicles, robots, drones, trains, or other vehicles.

For purposes of clarity, the embodiments described above relate to making parking recommendations for a single vehicle at a time. In other embodiments, however, embodiments can be configured to determine suitable parking locations for multiple vehicles simultaneously. This can be done by capturing one or more images of a set of vehicles, which could be configured in a line or other arrangement as they enter a parking facility (or a nearby area). The one or more images of multiple vehicles could be processed to identify each vehicle and associated parking parameter information using the processes described above. The system could then make simultaneous recommendations for each vehicle in the set of vehicles, providing a batch processing approach to parking recommendations. In particular, the parking recommendation algorithm may be configured to output multiple parking recommendations simultaneously with at least one recommendation for each of the vehicles captured in the one or more images. Moreover, the system could also provide navigation information for each vehicle according to the recommended parking region for each vehicle. Such embodiments could be useful in automatically recommending and guiding fleets of vehicles to various parking spaces, such as a fleet of rental cars within a parking garage.

An advantage of the batch processing approach is that the system can make multiple recommendations simultaneously, as opposed to making recommendations in a sequential order (one at a time), thereby saving time. Moreover, optimizing for multiple vehicles simultaneously allows the system to find solutions that are optimal for the set of vehicles. That is, when considering an individual (first) vehicle, a given (first) available parking region may be optimal. However, when considering the first vehicle and a second vehicle simultaneously, the system might determine that the first available parking region is a better choice for the second vehicle, and recommend another available parking region for the first vehicle (which is still in some sense optimal for the first vehicle).

The embodiments may make use of any suitable kinds of neural networks for performing various functions and tasks as described above. Neural network can be any type of neural network usable to perform neural network operations further described herein. In some embodiments neural networks are trained using a training framework such as a generative adversarial network (GAN). In some embodiments, a deep neural network is trained using a training dataset and training framework such as a CUDA, PyTorch framework, TensorFlow, Boost, Caffe, Microsoft Cognitive Toolkit/CNTK, MXNet, Chainer, Keras, Deeplearning4j, or other training framework. In one embodiment, weights may be chosen randomly or by pre-training using a deep belief network. In another embodiment training may be performed in either a supervised, partially supervised, or unsupervised manner.

In one embodiment, an untrained neural network is trained using supervised learning, where a training dataset includes an input paired with a desired output for an input, or where training dataset includes input having a known output and an output of neural network is manually graded. In another embodiment untrained neural network is trained in a supervised manner and processes inputs from training dataset and compares resulting outputs against a set of expected or desired outputs. In one embodiment, errors are then propagated back through untrained neural network. In another embodiment training framework adjusts weights that control untrained neural network. In one embodiment, training framework includes tools to monitor how well the untrained neural network is converging towards a model, such as a trained neural network, suitable to generating correct answers, based on input data such as a new dataset. In another embodiment, a training framework trains an untrained neural network repeatedly while adjusting weights to refine an output of untrained neural network using a loss function and adjustment algorithm, such as stochastic gradient descent. In one embodiment, the training framework trains untrained neural network until the untrained neural network achieves a desired accuracy. In another embodiment the trained neural network can then be deployed to implement any number of machine learning operations.

In other embodiments, the untrained neural network is trained using unsupervised learning, where the untrained neural network attempts to train itself using unlabeled data. In one embodiment, an unsupervised learning training dataset will include input data without any associated output data or "ground truth" data. In another embodiment an untrained neural network can learn groupings within the training dataset and can determine how individual inputs are related to the untrained dataset. In one embodiment, unsupervised training can be used to generate a self-organizing map in the trained neural network capable of performing operations useful in reducing dimensionality of a new dataset. In another embodiment unsupervised training can also be used to perform anomaly detection, which allows identification of data points in the new dataset that deviate from normal patterns of the new dataset.

In another embodiment, semi-supervised learning may be used, which is a technique in which in the training dataset includes a mix of labeled and unlabeled data. In one embodiment, the training framework may be used to perform incremental learning, such as through transferred learning techniques. In another embodiment incremental learning enables a trained neural network to adapt to a new dataset without forgetting knowledge instilled within the trained neural network during initial training.

Media generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA® Geforce Now (GFN), and the like.

In addition, sound or other audio generated applying one or more of the techniques disclosed herein may be produced by a speaker or other audio output device. In some embodiments, the audio device may be coupled directly to the system or processor generating the sound. In other embodiments, the audio device may be coupled indirectly to the system or processor such as via a network. Examples of such networks include the Internet, mobile telecommunications networks, a WIFI network, as well as any other wired and/or wireless networking system. When the audio device is indirectly coupled, the sound generated by the system or processor may be streamed over the network to the display device. Such streaming allows applications and other software which include audio to be executed on a server or in a data center and the generated sound to be transmitted and produced by one or more user devices (such as a computer, smartwatch, smartphone, other mobile device, etc.) that are physically separate from the server or data center. Hence, the techniques disclosed herein can be applied to enhance the sounds that are streamed and to enhance services that provide audio.

User interfaces for APIs (application programming interfaces) can be used to facilitate an end user's interaction with, for example, a distributed computing environment (e.g., a web-based application), or an application residing wholly on a single computer system (e.g., a stand-alone application). In different embodiments, one or more of the computing devices can include a device display ("display") that can, for example, present information and media for a software application ("app"). In some embodiments, the app is associated with or is a platform providing the audio modification assistant service. In some cases, user devices may run client software through a web browser, in which case the client software may be hosted on a server associated with computer system. In other cases, user device may run client software in the form of a native software application that has been downloaded through a centralized marketplace (i.e., an "app store"). In some embodiments, the app can be otherwise downloaded to be accessible locally on the device. In some cases, while the client software that allows users to perform various tasks may be run on user device, some of the software data may be retrieved from and stored on databases associated with a remote server.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present disclosure may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct disclosure as defined by the claims. Any feature or element of any embodiment may also be combined with features or elements from other disclosures to form another distinct disclosure as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

I claim:

1. A method, comprising:
receiving one or more vehicle images corresponding to at least an exterior of a vehicle;
receiving real-time parking space images corresponding to one or more parking spaces;
receiving nominal parking space dimensions of the one or more parking spaces, wherein the nominal parking space dimensions comprise at least a predefined length and a predefined width for each of the one or more parking spaces;
processing the real-time parking space images by a computer vision algorithm to determine real-time parking space dimensions of the one or more parking spaces and to infer physical deviations, caused by an encroachment into at least one of the one or more parking spaces, between the real-time parking space dimensions and the nominal parking space dimensions;
training a neural network to recommend a parking space based on vehicle parameter values corresponding to vehicles and parking space parameter values corresponding to vehicles parking spaces;
wherein the vehicle parameter values include vehicle dimensions and at least one of vehicle type, vehicle trunk clearance, vehicle door clearance, turning radius, parking assistance systems, vehicle permits, or classification tags;

wherein the parking space parameter values include nominal parking space dimensions, real-time parking space dimensions, and the inferred deviations;
processing the one or more vehicle images by a convolutional neural network to determine one or more values for one or more vehicle parameters corresponding to the vehicle;
comparing, by the trained neural network, the one or more values of the one or more vehicle parameters to one or more values of one or more parking space parameters corresponding to one or more parking spaces, wherein the comparing comprises comparing the vehicle dimensions to the real-time parking space dimensions and the nominal parking space dimensions; and
based at least on the comparing, recommending, by the trained neural network, at least one parking space of one or more parking spaces for the vehicle by:
retrieving parking space information about the one or more parking spaces; and
based on the inferred deviations and the retrieved parking space information, determining a subset of the one or more parking spaces that can accommodate the vehicle;
generating, by a navigation module, a route to the recommended at least one parking space for the vehicle; and
generating, by an augmented reality system, an augmented reality overlay of a virtual route representing the generated route on a display presenting a live video feed within the vehicle.

2. The method according to claim 1, wherein training the neural network to recommend a parking space based on vehicle parameter values corresponding to vehicles and parking space parameter values corresponding to vehicle parking spaces further includes training the neural network to recommend a parking space based on occupant parameters corresponding to occupants.

3. The method according to claim 2, further comprising:
using an object recognition model to detect one or more passengers in the one or more images; and
wherein processing the one or more images by the trained neural network to determine one or more values for one or more vehicle parameters corresponding to the vehicle further includes determining one or more values for one or more occupant parameters;
wherein comparing, by the trained neural network, the one or more values of the one or more vehicle parameters to one or more values of one or more parking space parameters corresponding to one or more parking spaces further includes comparing the one or more values of the one or more occupant parameters to one or more values of the one or more parking space parameters; and
wherein the one or more occupant parameters include one or more of: a passenger size, a passenger age, and a count of passengers in the vehicle.

4. The method according to claim 1, wherein the one or more images depict at least one of or at least a portion of an environment around the vehicle.

5. The method according to claim 1, wherein the method further comprises:
using an object recognition model to detect one or more occupant indicators in the one or more images; and
detecting at least one value of the one or more vehicle parameters associated with the one or more occupant indicators.

6. The method to claim 5, wherein the one or more occupant indicators are at least one of a handicap decal, a student driver decal, a parking permit, or a baby on board decal.

7. The method according to claim 1, further including:

applying batch processing to recommend at least one parking space of one or more parking spaces for multiple vehicles simultaneously.

8. A system, comprising:

one or more processors to:

receive one or more vehicle images corresponding to at least an exterior of a vehicle;

receive real-time parking space images corresponding to one or more parking spaces;

receive nominal parking space dimensions of the one or more parking spaces, wherein the nominal parking space dimensions comprise at least a predefined length and a predefined width for each of the one or more parking spaces;

process the real-time parking space images by a computer vision algorithm to determine real-time parking space dimensions of the one or more parking spaces and to infer physical deviations, caused by an encroachment into at least one of the one or more parking spaces, between the real-time parking space dimensions and the nominal parking space dimensions;

train a neural network to recommend a parking space based on vehicle parameter values corresponding to vehicles and parking space parameter values corresponding to vehicles parking spaces;

wherein the vehicle parameter values include vehicle dimensions and at least one of vehicle type, vehicle trunk clearance, vehicle door clearance, turning radius, parking assistance systems, vehicle permits, or classification tags;

wherein the parking space parameter values include nominal parking space dimensions, real-time parking space dimensions, and the inferred deviations;

process the one or more vehicle images by a convolutional neural network to determine one or more values for one or more vehicle parameters corresponding to the vehicle;

compare, by the trained neural network, the one or more values of the one or more vehicle parameters to one or more values of one or more parking space parameters corresponding to one or more parking spaces, wherein the comparing comprises comparing the vehicle dimensions to the real-time parking space dimensions and the nominal parking space dimensions;

and based at least on the comparing, recommend, by the trained neural network, at least one parking space of one or more parking spaces for the vehicle by:

retrieve parking space information about the one or more parking spaces; and based on the inferred deviations and the retrieved parking space information, determine a subset of the one or more parking spaces that can accommodate the vehicle;

generate, by a navigation module, a route to the recommended at least one parking space for the vehicle; and generate, by an augmented reality system, an augmented reality overlay of a virtual route representing the generated route on a display presenting a live video feed within the vehicle.

9. The system according to claim 8, wherein the system further comprises the one or more processors to process the one or more images and generate a text description which is processed using a large language model.

10. The system according to claim 8, wherein training the neural network to recommend a parking space based on vehicle parameter values corresponding to vehicles and parking space parameter values corresponding to vehicle parking spaces further includes training the neural network to recommend a parking space based on occupant parameters corresponding to occupants.

11. The system according to claim 10, wherein the system further comprises the one or more processors to:

use an object recognition model to detect one or more passengers in the one or more images; and wherein processing the one or more images by the trained neural network to determine one or more values for one or more vehicle parameters corresponding to the vehicle further includes determining one or more values for one or more occupant parameters;

wherein comparing, by the trained neural network, the one or more values of the one or more vehicle parameters to one or more values of one or more parking space parameters corresponding to one or more parking spaces further includes comparing the one or more values of the one or more occupant parameters to one or more values of the one or more parking space parameters; and wherein the one or more occupant parameters include one or more of: a passenger size, a passenger age, and a count of passengers in the vehicle, or at least one value of the one or more vehicle parameters associated with the one or more passengers.

12. The system according to claim 8, wherein the system further comprises the one or more processors to:

use an object recognition model to detect one or more occupant indicators in the one or more images; and detect at least one value of the one or more vehicle parameters associated with the one or more occupant indicators.

13. The system according to claim 12, wherein the one or more occupant indicators are at least one of a handicap decal, a student driver decal, a parking permit, or a baby on board decal.

14. A method, comprising:

receiving one or more vehicle images corresponding to at least an exterior of a vehicle;

receiving real-time parking space images corresponding to one or more parking spaces;

receiving nominal parking space dimensions of the one or more parking spaces wherein the nominal parking space dimensions comprise at least a predefined length and a predefined width for each of the one or more parking spaces;

processing the real-time parking space images by computer vision to determine real-time parking space dimensions of the one or more parking spaces and to infer physical deviations, caused by an encroachment into at least one of the one or more parking spaces, between the real-time parking space dimensions and the nominal parking space dimensions;

obtaining a trained neural network to recommend a parking space based on vehicle parameter values corresponding to vehicles and parking space parameter values corresponding to vehicles parking spaces;

wherein the vehicle parameter values include at least one of vehicle trunk clearance, vehicle door clearance, and turning radius;

wherein the parking space parameter values include nominal parking space dimensions, real-time parking space dimensions, and the inferred deviations;

processing the one or more images by a convolutional neural network to determine one or more values for one or more vehicle parameters corresponding to the vehicle;

comparing, by the trained neural network, the one or more values of the one or more vehicle parameters to one or more values of one or more parking space parameters corresponding to one or more parking spaces, wherein the comparing comprises comparing the vehicle dimensions to the real-time parking space dimensions and the nominal parking space dimensions; and based at least on the comparing, recommending, by the trained neural network, at least one parking space of one or more parking spaces for the vehicle by:

retrieving parking space information about the one or more parking spaces; and based on the inferred deviations and the retrieved parking space information, determining a subset of the one or more parking spaces that can accommodate the vehicle;

generating, by a navigation module, a route to the recommended at least one parking space for the vehicle; and generating, by an augmented reality system, an augmented reality overlay of a virtual route representing the generated route on a display presenting a live video feed within the vehicle.

15. The method according to claim 14, wherein training the neural network to recommend a parking space based on vehicle parameter values corresponding to vehicles and parking space parameter values corresponding to vehicle parking spaces further includes training the neural network to recommend a parking space based on occupant parameters corresponding to occupants.

16. The method according to claim 15, further comprising:

using an object recognition model to detect one or more passengers in the one or more images; and wherein processing the one or more images by the trained neural network to determine one or more values for one or more vehicle parameters corresponding to the vehicle further includes determining one or more values for one or more occupant parameters;

wherein comparing, by the trained neural network, the one or more values of the one or more vehicle parameters to one or more values of one or more parking space parameters corresponding to one or more parking spaces further includes comparing the one or more values of the one or more occupant parameters to one or more values of the one or more parking space parameters; and wherein the one or more occupant parameters include one or more of: a passenger size, a passenger age, and a count of passengers in the vehicle, or at least one value of the one or more vehicle parameters associated with the one or more passengers.

17. The method according to claim 14, wherein the one or more images depict at least one of an interior of the vehicle, an exterior of the vehicle, or at least a portion of an environment around the vehicle.

18. The method according to claim 14, further comprising:

using an object recognition model to detect one or more occupant indicators in the one or more images; and detecting at least one value of the one or more vehicle parameters associated with the one or more occupant indicators.

19. The method according to claim 18, wherein the one or more occupant indicators are at least one of a handicap decal, a student driver decal, a parking permit, or a baby on board decal.

20. The method according to claim 14, further including:

applying batch processing to recommend at least one parking space of one or more parking spaces for multiple vehicles simultaneously.

* * * * *